(12) United States Patent
Hoecker et al.

(10) Patent No.: US 9,580,584 B2
(45) Date of Patent: *Feb. 28, 2017

(54) POLYETHYLENE FOR INJECTION MOLDING

(71) Applicant: Basell Polyolefine GmbH, Wesseling (DE)

(72) Inventors: Bernd Hoecker, Wiesbaden (DE); Thomas Lindner, Groβ-Zimmern (DE); Peter Bisson, Ludwigshafen (DE); Gerd Mannebach, Münstermaifeld (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/029,744

(22) PCT Filed: Sep. 24, 2014

(86) PCT No.: PCT/EP2014/070319
§ 371 (c)(1),
(2) Date: Apr. 15, 2016

(87) PCT Pub. No.: WO2015/055393
PCT Pub. Date: Apr. 23, 2015

(65) Prior Publication Data
US 2016/0280896 A1    Sep. 29, 2016

(30) Foreign Application Priority Data

Oct. 15, 2013 (EP) .................................... 13188689

(51) Int. Cl.
*C08L 23/00* (2006.01)
*C08L 23/08* (2006.01)
*C08F 210/16* (2006.01)

(52) U.S. Cl.
CPC ........ *C08L 23/0815* (2013.01); *C08F 210/16* (2013.01); *C08F 2410/04* (2013.01); *C08F 2500/05* (2013.01); *C08F 2500/12* (2013.01); *C08F 2500/13* (2013.01); *C08L 2201/08* (2013.01); *C08L 2205/025* (2013.01); *C08L 2205/06* (2013.01); *C08L 2314/06* (2013.01); *C08L 2314/08* (2013.01)

(58) Field of Classification Search
CPC ............. C08L 23/0815; C08L 2201/08; C08L 2205/025; C08L 2205/06; C08L 2314/06; C08L 2314/08; C08F 210/16; C08F 2410/04; C08F 2500/05; C08F 2500/12; C08F 2500/13

See application file for complete search history.

(56) References Cited

U.S. PATENT DOCUMENTS

| 8,633,125 | B2 | 1/2014 | Kipke et al. | |
| 2011/0217499 | A1 | 9/2011 | Mannebach et al. | |
| 2011/0223406 | A1* | 9/2011 | Fantinel et al. | C08F 10/00 428/220 |
| 2012/0148777 | A1 | 6/2012 | Mannebach et al. | |
| 2013/0090433 | A1* | 4/2013 | Jiang et al. | C08F 210/18 525/232 |
| 2014/0100343 | A1* | 4/2014 | Ker et al. | B32B 27/32 526/147 |
| 2014/0213734 | A1* | 7/2014 | Jiang | C08F 255/02 525/322 |
| 2016/0237238 | A1* | 8/2016 | Hoecker | C08L 23/06 |

FOREIGN PATENT DOCUMENTS

| WO | WO-2005103096 A1 | 11/2005 |
| WO | WO 2010/022941 A1 | 3/2010 |
| WO | WO 2011/020622 A1 | 2/2011 |

OTHER PUBLICATIONS

PCT International Search Report & Written Opinion mailed Nov. 24, 2014 for PCT/EP2014/070319.

* cited by examiner

*Primary Examiner* — Nathan M Nutter

(57) ABSTRACT

The present disclosure relates to a polyethylene composition comprising copolymers of ethylene with 1-alkenes, or mixtures of ethylene homopolymers and said copolymers of ethylene with 1-alkenes, wherein the polyethylene composition has a molar mass distribution width (MWD) $M_w/M_n$ of from 7 to 15, a density of from 0.942 to 0.954 g/cm³, a weight average molar mass $M_w$ of from 20,000 g/mol to 500,000 g/mol, a MIE of from 1.0 to 3.0 g/10 min, a MIF of from 100 to 200 g/10 min, and a ratio MIF/MIE of from 40 to 50.

12 Claims, No Drawings

POLYETHYLENE FOR INJECTION MOLDING

This application is the U.S. National Phase of PCT International Application PCT/EP2014/070319, filed Sep. 24, 2014, claiming benefit of priority to European Patent Application No. 13188689.7, filed Oct. 15, 2013, the disclosures of which are incorporated herein by reference in their entirety.

FIELD OF THE INVENTION

The present disclosure relates to a novel polyethylene for injection molding of large, hollow objects.

BACKGROUND OF THE INVENTION

Injection molding is a molding technique suitable for molding small to large objects. A mold is generated in dedicated injection molding machines comprising a rotating screw in a barrel. The mold is injected continuously or with a mold buffer by means of pressure.

If the injectable object is large and complicated in shape, the pressure has to be very high in order to completely fill the cavity. Often several hot runners are used to overcome the high pressure level and to generate an even temperature profile while injecting polyethylene, in order to minimize the warpage of the injected large, hollow objects.

Examples of polyethylene for injection molding, particularly suited for preparing screw closures, are disclosed in WIPO Pat. App. Pub. No. WO2005103096.

SUMMARY OF THE INVENTION

The objective of the present disclosure is to devise a new, improved injection molding polyethylene material having a valuable balance of properties, e.g. for injected half shells for tanks, avoiding the tendency to high warpage and making it possible to lower the injection molding pressure generally required in the production of large, hollow objects.

This object is solved by the novel polyethylene of the present disclosure.

The present disclosure provides a polyethylene comprising copolymers of ethylene with 1-alkenes, or mixtures of ethylene homopolymers and copolymers of ethylene with 1-alkenes, where polyethylene has a molar mass distribution width (MWD) $M_w/M_n$ of from 7 to 15, a density of from 0.942 to 0.954 g/cm$^3$, such as 0.942 to 0.944 g/cm$^3$, as determined according to ISO 1183 at 23° C., a weight average molar mass $M_w$ of from 20,000 g/mol to 500,000 g/mol, a MIE of from 1.0 to 3.0 g/10 min, a MIF of from 100 to 200 g/10 min, including from 110 to 150 g/10 min, and a ratio MIF/MIE of from 40 to 50, where MIE is the melt flow rate at 190° C. with a load of 2.16 kg and MIF is the melt flow rate at 190° C. with a load of 21.6 kg, both determined according to ISO 1133.

DETAILED DESCRIPTION OF THE INVENTION

Examples of suitable 1-alkenes in the copolymers according to present disclosure are $C_3$-$C_{20}$-alpha-olefins such as propene, 1-butene, 1-pentene, 1-hexene, 4-methyl-1-pentene, 1-heptene or 1-octene.

According to the present disclosure, a copolymer is a co-polymer of ethylene with at least one comonomer, that is, a "copolymer" according to the present disclosure also encompasses ter-polymers and higher, multiple comonomer copolymers. As opposed to a homopolymer, a copolymer may comprise at least greater than 3.5% by weight of a comonomer in addition to ethylene, based on the total weight of the copolymer. In one embodiment, a "copolymer" is a truly binary copolymer of ethylene and substantially one species of comonomer only. "Substantially one species," as used herein, means that greater than 97% by weight of co-monomer is used.

The polyethylene of the present disclosure has a CDBI of 20-70%, including from 20% to less than 50%. CDBI (composition distribution breadth index) is a measure of the breadth of the distribution of the composition. This technique is described in WIPO Pat. App. Pub. No. WO 93/03093. The CDBI is defined as the weight percent of the copolymer molecules having comonomer contents of ±25% of the mean molar total comonomer content, i.e. the share of co-monomer molecules whose co-monomer content is within 50% of the average co-monomer content. This value is determined by TREF (temperature rising elution fraction) analysis (Wild et al., J. Poly. Phys. Ed., vol. 20. (1982) or U.S. Pat. No. 5,008,204). Optionally, it may be determined by crystallization analysis fractionation (CRYSTAF) analysis.

The polyethylene of the present disclosure has a weight average molar mass $M_w$ of from 40,000 g/mol to 200,000 g/mol, including from 50,000 g/mol to 150,000 g/mol. The z average molar mass $M_z$ of the polyethylene of the disclosure is, in some embodiments, in the range of less than $10^6$ g/mol, such as from 200,000 g/mol to 800,000 g/mol. The definition of z-average molar mas $M_z$ is defined in Peacock, A. (ed.), Handbook of PE, and is published in High Polymers Vol. XX, Raff and Doak, Interscience Publishers, John Wiley & Sons, 1965, S. 443.

The definition of $M_w$, $M_n$ and MWD can be found in the "Handbook of PE", ed. A. Peacock, p. 7-10, Marcel Dekker Inc., New York/Basel 2000. The determination of the means $M_n$, $M_w$ and $M_w/M_n$ derived therefrom was carried out by high-temperature gel permeation chromatography using a method described in DIN 55672-1: 1995-02, February 1985. The specific conditions used according to the mentioned DIN standard are as follows: solvent: 1,2,4-trichlorobenzene (TCB); temperature of apparatus and solutions: 135° C.; concentration detector: PolymerChar (Valencia, Paterna 46980, Spain) IR-4 infrared detector, suitable for use with TCB. Further details are given in the examples.

Furthermore, the amount of weight fraction of the polyethylene of the disclosure has, in certain embodiments, a molar mass of less than $10^6$ g/mol, as determined by GPC for standard determination of the molecular weight distribution, is above 95.5% by weight, such as above 96% by weight and above 97% by weight. This value is determined using molar mass distribution measurements by applying the WIN-GPC software of the company "HS-Entwicklungsgesellschaft für wissenschaftliche Hard- and Software mbH", Ober-Hlbersheim (Germany), for instance.

It is clear that for injection molding a very good flowing polyethylene has advantages in processing, however a good flowability in the molten state is difficult to achieve, especially when the polyethylene has very long chains, because this is very often leading to warpage. The polyethylene of the present disclosure allows of such long polyethylene chains, but still provides high flowability and low warpage of the hollow bodies.

The polyethylene of the present disclosure may be mono-modal or multi-modal, that is at least bimodal, as determined by high temperature gel permeation chromatography analysis (high temperature GPC for polymers according to the method described in DIN 55672-1: 1995-02 issued February 1995 with specific deviations made as said above, in the section on determining $M_w$, $M_n$ by means of HT-GPC). The molecular weight distribution curve of the GPC-multimodal polymer can be looked at as the superposition of the molecular weight distribution curves of the polymer subfractions which may show two or more distinct maxima or may be distinctly broadened compared with the curves for the individual fractions. A polymer showing such a molecular weight distribution curve is called "bimodal" or "multimodal" with regard to GPC analysis, respectively. Such GPC-multimodal polymers can be produced according to several processes, e.g. in a multistage process in a multi-step sequence as described in WIPO Pat. App. Pub. No. WO 92/12182.

In one embodiment, in conjunction with employing a mixed system of at least two single-site catalysts, the polyethylene of the present disclosure has a substantially monomodal molecular mass distribution curve as determined by GPC because the individual molecular weight distributions of polymer subfractions overlap and do not resolve two distinct maxima any more. Modality in the present context is defined as the number of instances where the value of the differential function of the mass distribution is 0 (i.e. the slope is 0) and wherein the differential value changes from positive to negative sign for increasing molar masses at the point having a functional value of 0. The mass distribution curve is not required to be perfectly bell-shaped; therefore it is merely "substantially" monomodal. In some embodiments, a monomodal distribution is obtained in situ in a one-pot reaction with a mixed or hybrid catalyst system, including with mixed single-site catalysts, giving rise to a particularly homogenous, in situ mixture of different catalyst products in which homogeneity is generally not obtainable by conventional blending techniques.

The polyethylene of the present disclosure has, in some embodiments, at least 0.6 vinyl groups/1,000 carbon atoms, e.g. from 0.6 up to 2 vinyl groups/1,000 carbon atoms, from 0.9 to 10 vinyl groups/1,000 carbon atoms and from 1 to 5 vinyl groups/1,000 carbon atoms, and in particular from 1.2 to 2 vinyl groups/1,000 carbon atoms. The content of vinyl groups/1,000 carbon atoms is determined by means of infrared (IR) spectroscopy, according to ASTM D 6248-98. For the present purpose, the expression "vinyl groups" refers to —CH═CH$_2$ groups; vinylidene groups and internal olefinic groups are not encompassed by this expression. Vinyl groups are often attributed to a polymer termination reaction after an ethylene insertion, while vinylidene end groups are usually formed after a polymer termination reaction following comonomer insertion. In some embodiments, at least 0.9 vinyl groups/1,000 carbon atoms, including 1 to 3 vinyl groups/1,000 carbon atoms and 1.3 to 2 vinyl groups/1,000 carbon atoms being present in the 20% by weight of the polyethylene having the lowest molar masses. This value can be determined by solvent-non-solvent fractionation, also called Holtrup fractionation as described in W. Holtrup, Markomol. Chem. 178, 2335 (1977), coupled with IR measurements of the different fractions, with the vinyl groups being measured in accordance with ASTM D 6248-98. Xylene and ethylene glycol diethyl ether at 130° C. are used as solvents for the fractionation. 5 g of polymer are used and are divided into 8 fractions.

The polyethylene of the present disclosure may have, in some embodiments, at least 0.005 vinylidene groups/1,000 carbon atoms, such as from 0.1 to 1 vinylidene groups/1,000 carbon atoms and from 0.14 to 0.4 vinylidene groups/1,000 carbon atoms. The determination is carried out by IR measurements in accordance with ASTM D 6248-98.

The polyethylene of the present disclosure may have, in some embodiments, from 0.7 to 20 branches/1,000 carbon atoms, such as from 0.7 to 10 branches/1,000 carbon atoms and from 1.5 to 8 branches/1,000 carbon atoms. The branches per 1,000 atoms are determined by means of $^{13}$C NMR, as described by James C. Randall, JMS-REV. Macromol. Chem. Phys. C29 (2&3), 201-317 (1989), and refer to the total content of CH$_3$ groups per 1,000 carbon atoms.

$^{13}$C NMR high temperature spectra of polymers are acquired on a Bruker DPX-400 spectrometer operating at 100.61 MHz in Fourier transform mode at 120° C.

The peak $S_{\delta\delta}$ [C. J. Carman, R. A. Harrington and C. E. Wilkes, Macromolecules, 10, 3, 536 (1977)] assigned to carbon is used as an internal reference at 29.9 ppm. The samples are dissolved in 1,1,2,2-tetrachloroethane-d2 at 120° C. with a 8% wt/v concentration. Each spectrum is acquired with a 90° pulse, 15 seconds of delay between pulses and CPD (WALTZ 16) to remove $^1$H-$^{13}$C coupling. About 1500-2000 transients are stored in 32 K data points using a spectral window of 6000 or 9000 Hz. The assignments of the spectra are made referring to made in accordance with Kakugo [M. Kakugo, Y. Naito, K. Mizunuma and T. Miyatake, Macromolecules, 15, 4, 1150, (1982)] and J. C. Randal, Macromol. Chem Phys., C29, 201 (1989).

NMR samples are placed in tubes under inert gas and, if appropriate, melted. The solvent signals serve as internal standards in the NMR spectra and their chemical shift is converted into the values relative to TMS.

The branches are, in certain embodiments, short chain branches (SCB) such as $C_2$-$C_6$ side chains.

In some embodiments, the polyethylene composition copolymerized with 1-butene, 1-hexene or 1-octene as the 1-alkene, has from 0.001 to 20 ethyl, butyl or hexyl short chain branches per 1,000 carbon atoms, such as from 2 to 6 ethyl, butyl or hexyl branches per 1,000 carbon atoms.

In further embodiments, the polyethylene of the present disclosure has a substantially multimodal, such as a bimodal, distribution in TREF analysis, determining the comonomer content based on crystallization behavior essentially independent of molecular weight of a given polymer chain.

A TREF-multimodal distribution means that TREF analysis resolves at least two or more distinct maxima indicative of at least two differing branching rates and hence comonomer insertion rates during polymerization reactions. TREF analysis analyzes comonomer distribution based on short side chain branching frequency essentially independent of molecular weight, based on the crystallization behavior (Wild, L., Temperature Rising Elution Fractionation, Adv. Polymer Sci. 8: 1-47, (1990); also see U.S. Pat. No. 5,008, 204, incorporated herewith by reference). Optionally to TREF, more recent CRYSTAF technique may also be employed. In some embodiments, the polyethylene of the present disclosure comprises at least two, such as substantially two, different polymeric sub-fractions that may be synthesized by different single-site catalysts, namely a first sub-fraction, synthesized by a non-metallocene catalyst, having a lower comonomer content, a high vinyl group content and a broader molecular weight distribution, and a second sub-fraction, synthesized by a metallocene catalyst, having a higher comonomer content.

Typically, the z-average molecular weight of the first or non-metallocene sub-fraction will be smaller or ultimately substantially the same as the z-average molecular weight of the second or metallocene sub-fraction. In certain embodiments, according to TREF analysis, 5-40% by weight, such as 20%-40% by weight of the polyethylene having the higher co-monomer content (and lower level of crystallinity) has a degree of branching of from 2 to 40 branches/1,000 carbon atoms and/or 5-40%, including 20%-40% by weight of the polyethylene having the lower comonomer content (and higher level of crystallinity) have a degree of branching of less than 2, including from 0.01 to less than 2 branches/ 1,000 carbon atoms. Likewise, where the polyethylene of the present disclosure displays a multimodal, that is at least bimodal distribution in GPC analysis, such as 5-40% by weight of the polyethylene having the highest molar masses, including 10-30% by weight and 20%-30% by weight, have a degree of branching of from 1 to 40 branches/1,000 carbon atoms, such as from 2 to 20 branches/1,000 carbon atoms.

Moreover, in certain embodiments up to 15%, including up to 5% by weight of the polyethylene having the lowest molar mass has a degree of branching of less than 5 branches/1,000 carbon atoms, such as less than 2 branches/ 1,000 carbon atoms.

Furthermore, in additional embodiments at least 70% of the branches of side chains larger than $CH_3$ in the polyethylene of the disclosure are present in the 50% by weight portion of the polyethylene having the highest molar mass. The part of the polyethylene having the lowest or highest molar mass is determined by the method of solvent-non-solvent fractionation, later called Holtrup fractionation as described above. The 8 fractions are examined by $^{13}C$-NMR spectroscopy. The degree of branching in the various polymer fractions can be determined by means of $^{13}C$-NMR as described by James C. Randall, JMS-REV. Macromol. Chem. Phys. C29 (2&3), 201-317 (1989). The degree of branching reflects the comonomer incorporation rate.

In some embodiments, the η (vis) value of the polyethylene of the present disclosure is 0.3 to 7 dl/g, such as from 1 to 1.5 dl/g or from 1.3 to 2.5 dl/g. η (vis) is the intrinsic viscosity as determined according to ISO 1628-1 and -3 in decalin at 135° C. by capillary viscosity measurement.

The polyethylene of the present disclosure may have a mixing quality measured in accordance with ISO 13949 of less than 3, such as from greater than 0 to 2.5. This value is based on the polyethylene taken directly from the reactor, i.e. the polyethylene powder without prior melting in an extruder. This polyethylene powder is obtainable by polymerization in a single reactor. The mixing quality of a polyethylene powder obtained directly from the reactor can be tested by assessing thin slices ("microtome sections") of a sample under an optical microscope. Inhomogeneities often show up in the form of specks or "white spots". The specs or "white spots" are predominantly high molecular weight, high-viscosity particles in a low-viscosity matrix (see, for example, U. Burkhardt et al. in "Aufbereiten von Polymeren mit neuartigen Eigenschaften", VDI-Verlag, Düsseldorf 1995, p. 71). Such inclusions can reach a size of up to 300 µm. They may cause stress cracks and result in brittle failure. The better the mixing quality of a polymer, the fewer and smaller are the inclusions observed. Thus, the number and size of these inclusions are counted and a grade is determined for the mixing quality of the polymer according to a set assessment scheme.

The polyethylene of the present disclosure has, in some embodiments, a degree of long chain branching λ (lambda) of from 0 to 2 long chain branches/10,000 carbon atoms, such as from 0.1 to 1.5 long chain branches/10,000 carbon atoms. The degree of long chain branching λ (lambda) can be measured by light scattering as described, for example, in ACS Series 521, 1993, Chromatography of Polymers, Ed. Theodore Provider; Simon Pang and Alfred Rudin: Size-Exclusion Chromatographic Assessment of Long-Chain Branch Frequency in Polyethylenes, page 254-269.

Any of the additives generally employed in the art can be present in the polyethylene of the present disclosure.

Examples are non-polymeric additives such as lubricants, antioxidants and/or stabilizers.

In general, mixing of the additives and the polyethylene of the present disclosure can be carried out by all known methods, such as directly by means of an extruder such as a twin-screw extruder. The polyethylene of the present disclosure is obtainable using the catalyst system described below. In certain embodiments, a single site catalyst or catalyst system is employed for providing the polyethylene of the present disclosure. In additional embodiments, the present technology employs a catalyst composition comprising at least two different single-site polymerization catalysts A) and B), of which A) is at least one metallocene polymerization catalyst, such as a hafnocene, and B) is at least one polymerization catalyst based on a non-metallocene transition metal complex, such as where B) is an iron complex component in which the iron complex has a tridentate ligand.

Suitable metallocene and hafnocene catalysts A) are referenced and disclosed in WIPO Pat. App. Pub. No. WO 2005/103096, which is incorporated herewith.

Particularly preferred are the hafnocene catalysts wherein the hafnium atom forms a complex with two cyclopentadienyl, indenyl or fluorenyl ligands, each ligand being optionally substituted with one or more $C_1$-$C_8$-alkyl and/or $C_6$-$C_8$ aryl groups, the free valencies of the hafnium atom being saturated with halogen, such as chlorine, or $C_1$-$C_4$ alkyl or benzyl groups, or a combination of them.

Specific examples are:
bis(cyclopentadienyl) hafnium dichloride,
bis(indenyl) hafnium dichloride,
bis(fluorenyl) hafnium dichloride,
bis(pentamethylcyclopentadienyl) hafnium dichloride,
bis(ethylcyclopentadienyl) hafnium dichloride,
bis(isobutylcyclopentadienyl) hafnium dichloride,
bis(3-butenylcyclopentadienyl) hafnium dichloride,
bis(methylcyclopentadienyl) hafnium dichloride,
bis(1,3-di-tert-butylcyclopentadienyl) hafnium dichloride,
bis(tert-butylcyclopentadienyl) hafnium dichloride,
bis(n-butylcyclopentadienyl) hafnium dichloride,
bis(phenylcyclopentadienyl) hafnium dichloride,
bis(1,3-dimethyl-cyclopentadienyl) hafnium dichloride,
bis(1-n-butyl-3-methylcyclopentadienyl) hafnium dichloride, and
and the corresponding dimethylhafnium compounds.

Suitable catalysts B) for use in certain embodiments include iron complexes having a tridentate ligand bearing at least two aryl radicals, such as those with aryl radicals bearing a halogen or tertiary alkyl substituent in the ortho-position.

In some embodiments for iron complexes for use in B), reference is made to WIPO Pat. App. Pub. No. WO 2005/ 103096, incorporated herewith by reference.

In some embodiments, tridentate ligands for use in the present technology are 2,6-bis[1-(phenylimino)ethyl] pyridine and the corresponding compounds, wherein both the two phenyl groups are substituted in the ortho-position with a halogen or tert-alkyl substituent, such as with a chlorine or tert-butyl group, the free valencies of the iron atom being saturated with halogen, for instance chlorine, or $C_1$-$C_{10}$ alkyl, or $C_2$-$C_{10}$ alkenyl, or $C_6$-$C_{20}$ aryl groups, or a combination thereof.

The preparation of the compounds for use in B) is described, for example, in J. Am. Chem. Soc. 120, p. 4049 (1998), J. Chem. Soc., Chem. Commun. 1998, 849, and WIPO Pat. App. Pub. No. WO 98/27124.

In non-limiting embodiments, examples of complexes for use in B) are:
2,6-bis[1-(2-tert.butylphenylimino)ethyl]pyridine iron(II) dichloride;
2,6-bis[1-(2-tert.butyl-6-chlorophenylimino)ethyl]pyridine iron(II) dichloride;
2,6-bis[1-(2-chloro-6-methylphenylimino)ethyl]pyridine iron(II) dichloride;
2,6-bis[1-(2,4-dichlorophenylimino)ethyl]pyridine iron(II) dichloride;
2,6-bis[1-(2,6-dichlorophenylimino)ethyl]pyridine iron(II) dichloride;
2,6-bis[1-(2,4-dichlorophenylimino)methyl]pyridine iron(II) dichloride;
2,6-bis[1-(2,4-dichloro-6-methylphenylimino)ethyl]pyridine iron(II) dichloride;
2,6-bis[1-(2,4-difluorophenylimino)ethyl]pyridine iron(II) dichloride;
2,6-bis[1-(2,4-dibromophenylimino)ethyl]pyridine iron(II) dichloride;
2,6-bis[1-(4,6-dimethyl-2-chloro-phenylimino) ethyl]pyridine iron(II) dichloride; or trichlorides, dibromides or tribromides thereof.

One hafnocene in A) may be used as a catalyst under the same reaction conditions in the homopolymerization or copolymerization of ethylene in a single reactor along with one sole complex B), wherein A) may produce a higher $M_w$ than B). In further embodiments, both the components A) and B) are supported. The two components A) and B) can be applied to different supports or together on a joint support. They may also be applied to a joint support in order to ensure a relatively close spatial proximity of the various catalyst centers and ensure good mixing of the different polymers formed. As for types and specifications of potential support materials, as well as for the use of activator components in addition to the catalyst, otherwise called co-catalysts, reference is made to WIPO Pat. App. Pub. No. WO 2005/103096, incorporated herewith by reference.

The use of co-catalyst components is known in the art of ethylene polymerization, as are the polymerization processes as described in WIPO Pat. App. Pub. No. WO 2005/103096.

As support materials, in certain embodiments silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethylene and acrylic esters, acrolein or vinyl acetate may be used.

The inorganic supports, like silica, can be subjected to a thermal treatment, e.g. to remove adsorbed water.

Such a drying treatment is generally carried out at temperatures in the range from 50° C. to 1000° C., such as from 100° C. to 600° C., with drying from 100° C. to 200° C. optionally being carried out under reduced pressure and/or under a blanket of inert gas (e.g. nitrogen), or the inorganic support can be calcined at temperatures from 200° C. to 1000° C. to produce the desired structure of the solid and/or set the desired OH concentration on the surface. The support can also be treated chemically using dessicants such as metal alkyls, including aluminum alkyls, chlorosilanes or $SiCl_4$, and methylaluminoxane. Appropriate treatment methods are described, for example, in WIPO Pat. App. Pub. No. WO 00/31090.

As a joint activator (co-catalyst) for the catalyst components A) and B), an aluminoxane, such as mono-methylaluminoxane (MAO), may be used in certain embodiments.

The catalyst component A) may be applied in such an amount that the concentration of the transition metal from the catalyst component A) in the finished catalyst system is from 1 to 200 μmol, including from 5 to 100 μmol and from 10 to 70 μmol, per g of support. The catalyst component B) may be applied in such an amount that the concentration of iron from the catalyst component B) in the finished catalyst system is from 1 to 200 μmol, including from 5 to 100 μmol and from 10 to 70 μmol, per g of support.

The molar ratio of catalyst component A) to activator (co-catalyst) can be from 1:0.1 to 1:10000, such as from 1:1 to 1:2000. The molar ratio of catalyst component B) to activator (co-catalyst) is, in certain embodiments, in a range from 1:0.1 to 1:10000, such as from 1:1 to 1:2000.

The catalyst component A), the catalyst component B) and the activator (co-catalyst) are all supported on the same support by contacting them with the support in suspension in a solvent, such as an hydrocarbon having from 6 to 20 carbon atoms, including xylene, toluene, pentane, hexane, heptane or a mixture thereof.

The process for polymerizing ethylene, alone or with 1-alkenes, can be generally carried out at temperatures in a range from 0° C. to 200° C., such as from 20° C. to 200° C. and from 25° C. to 150° C., and under pressures from 0.005 MPa to 10 MPa. The polymerization can be carried out in a known manner in bulk, in suspension, in the gas phase or in a supercritical medium in the customary reactors used for the polymerization of olefins.

The mean residence times are, in some embodiments from 0.5 to 5 hours, such as from 0.5 to 3 hours. The advantageous pressure and temperature ranges for carrying out the polymerizations usually depend on the polymerization method.

Among the polymerization processes, gas-phase polymerization, including gas-phase fluidized-bed reactors, solution polymerization and suspension (slurry) polymerization, in loop reactors and stirred tank reactors may be used in some embodiments.

Hydrogen may be used as a molar mass regulator.

Furthermore, customary additives such as antistatics, can also be used in the polymerizations.

The polymerization is, in further embodiments carried out in a single reactor, in particular in a gas-phase or slurry reactor.

The polyethylene can be processed on conventional injection molding machines. The finish on the moldings obtained is homogeneous and can be improved further by increasing the rate of injection or raising the mold temperature.

The present disclosure further relates to an injection molded article comprising the polyethylene of the invention.

The injection molded article can be a container, in particular a tank, having a large volume, preferably a container of at least 5 L volume, more preferably of from 5 to 100 L volume, most preferably of from 10 to 100 L volume.

The injection molded article can also be an inner part of a tank e.g. a slosh baffle.

In particular, for "comprising" it is meant here that the injection molded article comprises from 50% to 100% by weight of the polyethylene of the present disclosure.

In some embodiments, the present technology relates to an injection molded article comprising the polyethylene of the present disclosure or a mixture of polyethylenes of the disclosure as the only polymeric constituent.

When the container is obtained by sealing together two injection molded half shells, the very low warpage of the polyethylene of the present disclosure is particularly advantageous, because the resulting half shells are easily sealable due to their good planarity.

EXAMPLES

The following examples are included to demonstrate certain embodiments of the disclosure. It should be appreciated by those of skill in the art that the techniques disclosed in the examples which follow represent techniques discovered by the inventor to function well in the practice of the technology. However, those of skill in the art should, in light of the present disclosure, appreciate that many changes can be made in the specific embodiments which are disclosed and still obtain a like or similar result without departing from the spirit and scope of the technology.

Unless otherwise stated, the following test methods are used to determine the properties reported in the detailed description and in the examples.

The density [g/cm$^3$] was determined in accordance with ISO 1183 at 23° C.

The determination of the molar mass distributions and the means $M_n$, $M_w$, $M_z$ and $M_w/M_n$ derived therefrom was carried out by high-temperature gel permeation chromatography using a method essentially described in DIN 55672-1:1995-02 (February 1995). The methodological deviations applied in view of the mentioned DIN standard are as follows: solvent was 1,2,4-trichlorobenzene (TCB), temperature of apparatus and solutions was 135° C. and as a concentration detector, use of a PolymerChar (Valencia, Paterna 46980, Spain) IR-4 infrared detector, capable for use with TCB.

A WATERS Alliance 2000 equipped with the precolumn SHODEX UT-G and separation columns SHODEX UT 806 M (3×) and SHODEX UT 807 connected in series was used. The solvent was vacuum distilled under nitrogen and was stabilized with 0.025% by weight of 2,6-di-tert-butyl-4-methylphenol. The flow rate was 1 ml/min, the injection volume was 500 μl and polymer concentration was in a range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in a concentration range from 580 g/mol up to 11600000 g/mol and further supplemented with hexadecane. The calibration curve was then adapted to polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $α_{PS}$=0.706 and for PE $k_{PE}$=0.000406 dl/g, $α_{PE}$=0.725, valid in TCB at 135° C. Data recording, calibration and calculation was carried out using NTGPC_Control_V6.02.03 and NTGPC_V6.4.24 (hs GmbH, Hauptstraße 36, D-55437 Ober-Hilbersheim), respectively.

The environmental stress cracking resistance of polymer samples is determined in accordance with international standard ISO 16770 (FNCT) in aqueous surfactant solution. From the polymer sample a compression molded 10 mm thick sheet has been prepared. The bars with squared cross sections (10×10×100 mm) are notched using a razor blade on four sides perpendicularly to the stress direction. A notching device as described in M. Fleissner in Kunststoffe 77 (1987), pp. 45 is used for the sharp notch with a depth of 1.6 mm. The load applied is calculated from the tensile force divided by the initial ligament area. The ligament area is the remaining area equal to the total cross-section area of specimen minus the notch area. For a FNCT specimen: 10×10 mm$^2$−4 times of trapezoid notch area=46.24 mm$^2$ (the remaining cross-section for the failure process/crack propagation). The test specimen is loaded under the standard conditions suggested by the ISO 16770 with a constant load of 4 MPa at 80° C. in a 2% (by weight) water solution of the non-ionic surfactant ARKOPAL N100. Time until rupture of test specimen is detected.

The Charpy impact strength acN was determined according to ISO 179 at −30° C.

The spiral flow test was measured on a Demag ET100-310 with a closing pressure of 100 t and a 3 mm die and with a stock temperature of 250° C., an injection pressure of 1000 bar, a screw speed of 90 mm/s, a mold temperature of 30° C. and wall thickness 2 mm.

Example 1

Preparation of the Individual Catalyst Components

Bis(n-butylcyclopentadienyl)hafnium dichloride is commercially available from Crompton Ltd.

2,6-bis[1-(2,4-dichloro-6-methylphenylimino)ethyl]pyridine iron(II) dichloride was prepared as described in the examples of WIPO Pat. App. Pub. No. WO2005103096.
Support Pretreatment XPO-2107, a spray-dried silica gel from Grace, was baked at 600° C. for 6 hours.
Preparation of the Mixed Catalyst System The mixed catalyst system was prepared as described in Example 1 of WIPO Pat. App. Pub. No. WO2005103096.
Polymerization Using the above prepared catalyst, the polymerization was carried out in a fluidized-bed reactor having a diameter of 0.5 m as described in Example 1 of WIPO Pat. App. Pub. No. WO2005103096, but with the following differences in process conditions.

The polymerization temperature and pressure were 102° C. and 24 bar. Ethylene was fed to the reactor at a rate of 53 kg per h, 1-hexene at a rate of 1600 g per h and hydrogen at 1.71 per h.

The polymer was discharged at 51 kg/h.

The properties of the polymer obtained are reported in Table 1.

TABLE I

| Example Properties | Unit | Ex. 1 |
| --- | --- | --- |
| Density | g/cm$^3$ | 0.944 |
| MI 2.16 kg (MIE) | g/10 min. | 2.6 |
| MI 21.6 kg (MIF) | g/10 min. | 120 |
| MIF/MIE |  | 46 |
| $M_w$ | g/mol | 110000 |
| $M_n$ | g/mol | 13500 |
| $M_w/M_n$ |  | 8.1 |
| FNCT | h | 5 |
| Spiral length | mm | 260 |
| Charpy acN −30° C. | kJ/m$^2$ | 5.7 |

Although the present disclosure and its benefits have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, compositions of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A polyethylene composition comprising copolymers of ethylene with $C_3$-$C_{20}$ 1-alkenes, or mixtures of ethylene homopolymers and copolymers of ethylene with $C_3$-$C_{20}$ 1-alkenes, wherein the polyethylene composition has a molar mass distribution width (MWD) $M_w/M_n$ of from 7 to 15, a density of from 0.942 to 0.954 g/cm$^3$, determined according to ISO 1183 at 23° C., a weight average molar mass $M_w$ of from 20,000 g/mol to 500,000 g/mol, a MIE of from 1.0 to 3.0 g/10 min, a MIF of from 100 to 200 g/10 min, and a ratio MIF/MIE of from 40 to 50, where MIE is the melt flow rate at 190° C. with a load of 2.16 kg and MIF is the melt flow rate at 190° C. with a load of 21.6 kg, both determined according to ISO 1133.

2. The polyethylene composition of claim 1, comprising 0.7 to 20 $CH_3$/1000 carbon atoms as determined by $^{13}C$-NMR.

3. The polyethylene composition of claim 1, comprising at least one $C_3$-$C_{20}$-alpha-olefin monomer species in an amount greater than 3.5% by weight based on the total weight of the polyethylene composition.

4. The polyethylene composition of claim 1, comprising a vinyl group content of at least 0.6 vinyl groups/1000 C atoms, and wherein the amount of the polyethylene composition with a molar mass of below $10^6$ g/mol, as determined by GPC, is above 95.5% by weight, based on the total weight of the polyethylene.

5. The polyethylene composition of claim 1, comprising a η(vis) value of from 0.3 to 7 dl/g, wherein η(vis) is the intrinsic viscosity as determined according to ISO 1628-1 and -3 in decalin at 135° C.

6. The polyethylene composition of claim 1, wherein the polyethylene composition is produced in one polymerization step in a single reactor by a mixed catalyst system comprising at least one metallocene.

7. The polyethylene composition of claim 6, wherein the polyethylene composition is produced in the presence of a catalyst composition comprising at least two different single-site polymerization catalysts.

8. The polyethylene of claim 7, obtainable by copolymerizing ethylene with one or several $C_3$-$C_{20}$-alpha-olefin monomer species at a temperature of from 20 to 200° C. and at a pressure of from 0.05 to 10 MPa.

9. The polyethylene of claim 1, further comprising non-polymeric additives selected from the group consisting of lubricants, antioxidants, stabilizers and combinations thereof.

10. An injection molded article comprising the polyethylene composition of claim 1.

11. The injection molded article of claim 10, comprising a container with a volume of at least 5 L.

12. The injection molded article of claim 10, comprising an inner part of a tank.

* * * * *

UNITED STATES PATENT AND TRADEMARK OFFICE
CERTIFICATE OF CORRECTION

PATENT NO.       : 9,580,584 B2
APPLICATION NO.  : 15/029744
DATED            : February 28, 2017
INVENTOR(S)      : Bernd Hoecker et al.

It is certified that error appears in the above-identified patent and that said Letters Patent is hereby corrected as shown below:

| | | |
|---|---|---|
| Column 2 | Line 55 | Delete "and" and insert --und-- |
| Column 4 | Lines 7-8 | Delete "$^{13}$C NMR," and insert --$^{13}$C-NMR,-- |
| Column 4 | Line 11 | Delete "$^{13}$C NMR" and insert --$^{13}$C-NMR-- |
| Column 7 | Line 66 | Delete "dessicants" and insert --desiccants-- |
| Column 12 | Line 20 | In Claim 8, after "polyethylene", insert --composition-- |
| Column 12 | Line 24 | In Claim 9, after "polyethylene", insert --composition-- |

Signed and Sealed this
Tenth Day of September, 2019

Andrei Iancu
*Director of the United States Patent and Trademark Office*